United States Patent [19]

Rossollin

[11] 4,183,891

[45] Jan. 15, 1980

[54] METHOD FOR FOLDING SHEET-SHAPED PLASTIC MATERIAL AND FOLDED SHEET-SHAPED PLASTIC MATERIAL OBTAINED BY CARRYING OUT THIS METHOD

[75] Inventor: Jean-Claude M. M. Rossollin, Chamonix-Mont-Blanc, France

[73] Assignee: United Patents Trust Reg.-U.P.T., Liechtenstein

[21] Appl. No.: 834,725

[22] Filed: Sep. 19, 1977

[30] Foreign Application Priority Data

Sep. 24, 1976 [CH] Switzerland .................. 12109/76

[51] Int. Cl.$^2$ .............................................. B28B 1/48
[52] U.S. Cl. ..................................... 264/154; 264/156; 264/163; 264/284; 264/293; 264/295
[58] Field of Search ............. 264/154, 155, 163, 284, 264/293, 295, 156; 220/DIG. 14, 339

[56] References Cited

U.S. PATENT DOCUMENTS

| | | | |
|---|---|---|---|
| 3,615,149 | 10/1971 | Malone et al. | 264/295 |
| 3,950,208 | 4/1976 | Pavak | 264/156 |
| 4,007,538 | 2/1977 | Petrie | 264/295 |
| 4,064,206 | 12/1977 | Seufert | 264/295 |

*Primary Examiner*—Jan H. Silbaugh
*Assistant Examiner*—John A. Parrish
*Attorney, Agent, or Firm*—Silverman, Cass & Singer

[57] ABSTRACT

Method for forming a folded sheet of plastic with reinforcing ribs disposed transverse to the line of fold. The line of fold or weakening line is provided with a plurality of weakening grooves separated by unweakened material of the sheet. When the sheet is folded, unweakened material is drawn out to form reinforcing ribs transverse to the weakening line and in the dihedral angle of the fold. The length of the unweakened material between the grooves is dimensionally variable to provide an adjustable resistance to folding.

2 Claims, 2 Drawing Figures

METHOD FOR FOLDING SHEET-SHAPED PLASTIC MATERIAL AND FOLDED SHEET-SHAPED PLASTIC MATERIAL OBTAINED BY CARRYING OUT THIS METHOD

BACKGROUND OF THE INVENTION

The present invention relates to a method for folding sheet-shaped plastic material and to a folded sheet-shaped plastic material obtained by carrying out this method.

The folding of sheets of plastic material, especially for the realization of boxes, packings, etc., which must be available a flat condition and be folded by the user, gives rise to several problems, so that, in most of the cases, the sheets are not made of only one and the same material but are made of several materials, constituting successive layers.

Most of the known folding methods have drawbacks in that the operation must be effected in heated condition, or that the sheet is weakened too much at the place of the folding, if the operation is effected in a cold condition along a weakening line. It is moreover difficult, in this latter case, to determine precisely what will be the resistance to the folding, that is however necessary when the folding is effected with a machine.

The purpose of the present invention is to remove these drawbacks.

SUMMARY OF THE INVENTION

The method according to the invention is characterized by the fact that one provides in the thickness of the said sheet a weakening groove constituted of successive lengths, then effects the folding of the sheet, along the said weakening groove, the material of the sheet situated between the lengths of the said groove being drawn out during the folding and constituting reinforcing ribs in the dihedral angle of folding.

The folded sheet of plastic material obtained by carrying out this method is characterized by the fact that it is provided, at the back of the folding line, with a folding dihedral angle provided with reinforcing ribs.

BRIEF DESCRIPTION OF THE DRAWING

The drawings show, by way of example, one embodiment of the object of the invention.

DESCRIPTION OF THE PREFERRED EMBODIMENTS

Figure 1:
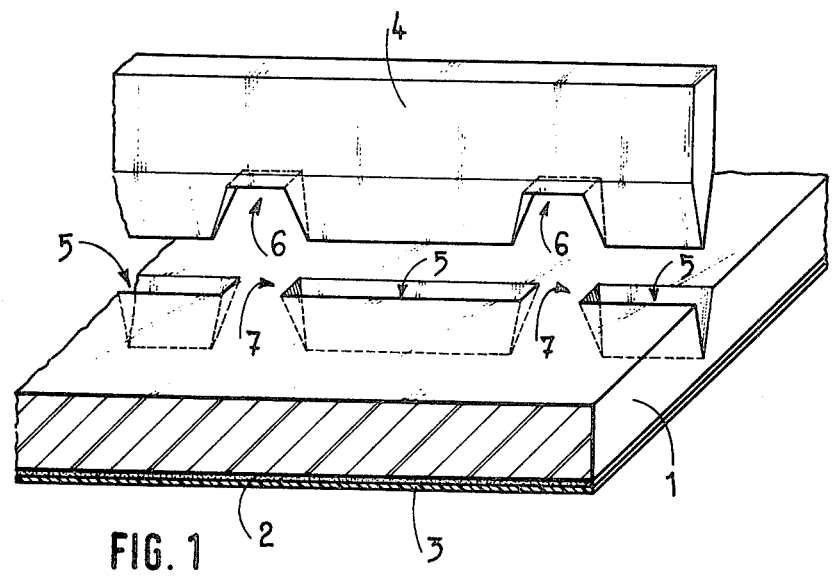
FIG. 1 is a perspective view of a portion of a sheet of plastic material on which a folding preparing operation has been already effected.
Figure 2:
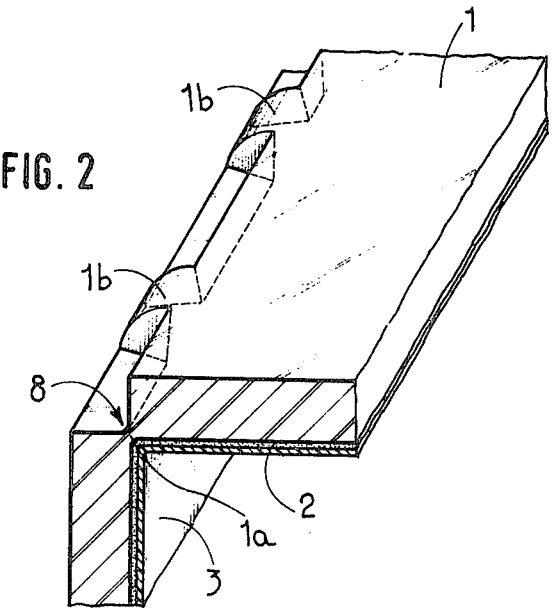
FIG. 2 is a perspective view of this same portion of the sheet of plastic material represented in the folded condition.

The sheet of plastic material as disclosed and represented in a composite sheet comprising a layer 1 of P.V.C., of a thickness of 200 microns for instance, a layer 2 of glue, of a thickness of 3 microns for instance, and a layer 3 of polyester, of a thickness of 12 microns for instance.

So as to permit the folding of this sheet, one provides in the sheet, preferably in a cold condition, but, may be, in a hot condition, by means of a point or chisel 4, having the shape of a blade of knife, a weakening groove 5, of V-shaped cross-section, constituted by successive lengthes, and the depth of which will be, for instance, of 75 to 80% of the thickness of the sheet.

The interruptions of the weakening groove 5 are due to the fact that the blade constituting the chisel shows, at distance one from another, notches 6 the length of which is 1 mm for instance. These notches provide, this way, between the lengths of the groove 5, portions 7 where the material of the plastic sheet is not grooved.

The folding of the sheet is effected progressively, preferably in a cold condition, but, may be, in a hot condition too, along the weakening groove 5, the material of which, which constitutes the bottom 1a of the groove, in is then drawn out. This operation provides, at the back of the folding line, a dihedral angle 8 interrupted by ribs 1b constituted by the material of the portions 7 situated between the lengths of the grooves 5 and which is also drawn out during the folding.

Owing to this arrangement, not only the folding area is reinforced, but, moreover, the resistance of the sheet to the folding, which is important when the folding is effected by means of a machine, for instance on goods conditioning machines, can be adjusted by selecting the distance separating one from the other, the not grooved portions 7.

As a modification, one could provide that the portions 7 situated between the lengths of the groove 5 be also provided with recesses, situated in alignment with the groove 5, but of less depth than this latter.

The sheets of plastic material folded according to the present method can be of any type, either of one material or of a composite material, as in the example disclosed, or constituted, for instance, by a film of polyethylene of 30 microns, of a sheet of crystal polystyrene of 200 microns, of a layer of glue of 3 microns and of a film of polyester of 12 microns. The layer of polyethylene will then serve to prevent the reinforcing ribs from breaking during the folding, the crystal polystyrene being breakable in a cold condition.

What I claim is:

1. A method for folding sheet-shaped plastic material comprising the steps of, forming a plurality of weakening grooves in the material along a longitudinal weakening line of the material, said grooves being separated from each other by unweakened material of the sheet, the length of the unweakened material separating the weakening grooves being dimensionally variable to provide an adjustable resistance to folding of the material along the weakening line, and folding the material along the weakening line to draw out the unweakened material separating the weakening grooves to form reinforcing ribs disposed transverse to the weakening line and in the dihedral angle of folding.

2. A method for folding sheet-shaped plastic material as claimed in claim 1 further comprising providing longitudinally of the weakening line recesses in the unweakened material between the weakening grooves, said recesses being of less depth in the material than the depth of the weakening grooves.

* * * * *